United States Patent
Liu et al.

(10) Patent No.: US 12,491,279 B2
(45) Date of Patent: Dec. 9, 2025

(54) METHOD AND DEVICE FOR MONITORING THE STATUS OF A HIGH-LEVEL DISINFECTION DEVICE

(71) Applicant: LUMICARE IP PTY LTD, Victoria (AU)

(72) Inventors: Tong Liu, Victoria (AU); Andrew Kobylinski, Victoria (AU); Matthew Hollier, Victoria (AU); Bo Sun, Victoria (AU); Guang Gao, Victoria (AU)

(73) Assignee: LUMICARE IP PTY LTD, Brighton (AU)

( * ) Notice: Subject to any disclaimer, the term of this patent is extended or adjusted under 35 U.S.C. 154(b) by 865 days.

(21) Appl. No.: 17/621,054

(22) PCT Filed: Jun. 21, 2020

(86) PCT No.: PCT/AU2020/000054
§ 371 (c)(1),
(2) Date: Dec. 20, 2021

(87) PCT Pub. No.: WO2020/252514
PCT Pub. Date: Dec. 24, 2020

(65) Prior Publication Data
US 2022/0331469 A1    Oct. 20, 2022

(30) Foreign Application Priority Data
Jun. 21, 2019   (AU) .................................. 2019902171

(51) Int. Cl.
*A61L 2/24*   (2006.01)
*A61L 2/10*   (2006.01)
(Continued)

(52) U.S. Cl.
CPC .................................. *A61L 2/24* (2013.01);
*A61L 2/10* (2013.01); *G01R 19/1659* (2013.01);
(Continued)

(58) Field of Classification Search
CPC ..... A61L 2/10; A61L 2/24; A61L 2/28; A61L 2202/11; A61L 2202/122; A61L 2202/14;
(Continued)

(56) References Cited

U.S. PATENT DOCUMENTS

2012/0299481 A1   11/2012   Stevens
2014/0341777 A1 * 11/2014   Deshays ................... A61L 2/10
                                                          250/354.1
(Continued)

FOREIGN PATENT DOCUMENTS

CN    101900786 A  *  2/2010  ............. G01R 31/26
CN    102118913 A  *  7/2011  ............. H05B 37/03
(Continued)

OTHER PUBLICATIONS

English translation of CN101900786A (Year: 2010).*
(Continued)

*Primary Examiner* — Eman A Alkafawi
*Assistant Examiner* — Courtney G Mcdonnough
(74) *Attorney, Agent, or Firm* — DITTHAVONG, STEINER & MLOTKOWSKI

(57) ABSTRACT

There is disclosed a method of monitoring the functionality of individual irradiation emitters within a UVC irradiation disinfecting device comprising: supplying a constant current supply to at least one irradiation emitter; sensing the voltage across the at least one irradiation emitter; sensing the current drawn by the at least one irradiation emitter; analysing the sensed voltage and the sensed current against predetermined
(Continued)

values; and determining a failure state of the at least one irradiation emitter based on said analysis.

21 Claims, 5 Drawing Sheets

(51) Int. Cl.
*G01R 19/165* (2006.01)
*G01R 31/52* (2020.01)

(52) U.S. Cl.
CPC ........... *G01R 31/52* (2020.01); *A61L 2202/11* (2013.01); *A61L 2202/122* (2013.01); *A61L 2202/14* (2013.01); *A61L 2202/24* (2013.01)

(58) Field of Classification Search
CPC ............ A61L 2202/24; G01R 19/0038; G01R 19/16571; G01R 19/16576; G01R 19/1659; G01R 31/52
USPC ........................................................ 324/522
See application file for complete search history.

(56) References Cited

U.S. PATENT DOCUMENTS

| 2015/0084637 | A1 | 3/2015 | Boehnel |
| 2016/0271284 | A1 | 9/2016 | Lichtblau |
| 2019/0132917 | A1* | 5/2019 | Veenstra ................. H05B 45/58 |
| 2019/0200424 | A1* | 6/2019 | Mochizuki ............. H05B 45/56 |

FOREIGN PATENT DOCUMENTS

| CN | 105067035 A | * | 11/2015 | |
| CN | 105355069 A | * | 2/2016 | ............ G08G 1/097 |
| WO | 2014/186741 A1 | | 11/2014 | |
| WO | 2020/252514 A1 | | 12/2020 | |

OTHER PUBLICATIONS

English translation of CN102118913A (Year: 2011).*
English translation CN105355069A (Year: 2016).*
English translation CN102118913A (Year: 2011).*
English translation CN105067035A (Year: 2015).*
International Search Report and Written Opinion of the International Searching Authority for related International Application No. PCT/AU2020/000054, dated Aug. 26, 2020, 16 pages.

* cited by examiner

METHOD AND DEVICE FOR MONITORING THE STATUS OF A HIGH-LEVEL DISINFECTION DEVICE

RELATED APPLICATION(S)

The present application claims priority from Australian Provisional Application No. 2019902171, filed 21 Jun. 2019, the entire contents of which are incorporated herein by reference.

FIELD OF INVENTION

The present invention relates generally to a method and device for the disinfection of medical instruments, and in particular, to a method and device capable of performing high-level disinfection of medical instruments, such as ultrasound transducers.

BACKGROUND OF THE INVENTION

Within the medical industry, a variety of different types of sterilisation and disinfecting methods and systems have been proposed for use on a variety of different devices and equipment. The degree of sterilisation or disinfection required for a specific device or piece of equipment will largely depend upon the manner in which the device or equipment is used and the likelihood of cross-contamination between users of the device or equipment.

In the field of diagnostic ultrasound machines, ultrasound transducers are employed which are used to contact the human body in order to generate appropriate images for analysis by healthcare professionals. Such transducers are used in a variety of different applications depending upon the area of the body requiring imaging, including intraoperative tissue biopsy and venous intubation. In this regard, the transducers may be used in contact with individuals having healthy and intact skin, through to individuals with skin lacerations and other conditions where the transducer may be in direct contact with mucous membranes and blood, as well as other bodily secretions. Due to the large range of use of such transducers on individuals with a variety of different conditions, there is an increased likelihood that the surface of the transducer may be in contact with various microorganisms which are carried on the surface of the transducer. Thus, it is critically important that after use, such transducers undergo a high level disinfecting or sterilisation process, to eliminate any organisms that may be present on the surface thereof.

To achieve such a high-level degree of disinfection, there exist currently four processes capable of fulfilling this requirement. These processes include: chemical immersion or soaking, chemical aerosol, surface wiping, and UVC irradiation:

Chemical immersion or soaking is a process that requires placing the ultrasound transducer such that it is immersed into a chemical reagent. One example of such system is the GUS Disinfection Soak Station made by CIVCO Medical Solutions. Such processes generally require a soaking time for the transducer to be left immersed in the chemical reagent, which can range from around 8 minutes to 45 minutes. Whilst the appropriate level of disinfection may be achievable, the disadvantage of this process is that the chemical reagent is hazardous and any exposure to the chemical reagent may harm the operator and patient, and may cause damage to the medical instrument if not appropriately controlled. Further to this, the chemical waste generated by this method of disinfection may cause significant harm to the environment. Further, as care is required in handling the chemicals, this method is manually operated and time-consuming Chemical aerosol is a process whereby the ultrasound transducer is placed within a chamber that is flooded with a nebulised hydrogen peroxide. One example of such a commercially available system that employs this process is the system developed by Nanosonics Ltd. under the brand Trophon. Typically, the transducer is placed within the chamber for between 7 to 12 minutes, depending on the specific conditions. Once again, due to the use of the chemical reagent, the disadvantage of this method is that the residual of chemical reagent left on transducers may harm the operators and patients.

It is possible to achieve the desired level of disinfection through the use of surface wipes. Such a process uses different chemical wipe combinations to manually wipe the surface of the transducer. The disinfecting chemical solution present within the wipes is able to contact the surface of the medical instrument to eliminate the presence of the microorganism on the surface of the medical instrument. Such a procedure requires steps of pre-cleaning, disinfection and rinsing. One example of such a commercially available method of using surface wipes is using chlorine dioxide formulation made by Tristel. However, a drawback with such a method is that it requires manual application and is prone to human error through uneven contact of the wipe on the surface of the instrument, and is costly and time intensive.

The remaining process for achieving such a high-level degree of disinfection is through the use of UVC irradiation, typically by way of lighting through mercury vapour tubes. By applying ultraviolet light of a specific wavelength onto a surface of a medical instrument, microorganisms present thereon can be eliminated by the irradiation. Such a process requires the medical instrument to be positioned within a chamber having multiple gas discharge lamps (mercury vapor tubes) arranged thereabout, to function as light sources for disinfection. There are several commercial systems available which utilise UVC irradiation to disinfect ultrasound transducers. However, all of these systems use mercury vapour tubes as their UVC light source. Such tubes pose a potential risk to operators who may be exposed to mercury vapour leakage from the tubes. In addition, the disposal of these mercury vapour tubes is harmful to the environment and requires additional cost and complexity to do so in a safe way. Such disposal problems are significant and have been raised by the UN Minamata Convention on Mercury in 2013, where an international treaty was enacted to protect human health and the environment from anthropogenic emissions and releases of mercury and mercury compounds. This treaty sets down controlling measures over a variety of products containing mercury, the manufacture, import and export of which will be altogether prohibited by 2020.

In addition to the problems associated with continuing to use mercury vapour tubes, such tubes can only emit UVC with wavelength at 254 nm, which is inefficient for germicidal efficacy, requiring longer exposure times to achieve the desired level of disinfection.

More recently, the present Applicant has proposed a device that utilises UVC LEDs mounted upon an inner wall of an enclosure emit UVC light to irradiate all surfaces of a medical instrument located within the enclosure. Such a device is disclosed in the Applicants co-pending Australian Provisional Patent Application No. 2019902886, which is incorporated herein by reference. Whilst the device has proven effective in providing an improved means for achieving high-level disinfection, due to the large number of UVC LEDs employed in the device and the need for the UVC LEDs to irradiate all surfaces of the medical instrument, any defective or faulty UVC LEDs can result in the disinfecting procedure becoming compromised.

In other types or irradiation disinfecting systems, optical sensors have been employed to detect the amount of illumination present and when the illumination falls below a level, it is indicative if a failure within the illumination sources. However, such an error detection system has a number of weaknesses. For devices with multiple LEDs, a precise optical monitoring system requires multiple optical sensing units, adding to the cost of implementing such a system. Further, as the light from different LEDs has a tendency to interfere with each other, the accuracy of the optical sensing system is significantly reduced. Also, given the limited space within a disinfection chamber and the curved surfaces, it is difficult to suitably position the optical sensing units in a manner which is capable of determining optimum illumination characteristic with any degree of accuracy.

Thus, there is a need to provide a system and method of monitoring the functioning status of the UVC LEDs present in such a disinfecting device to detect any inactivity of the UVC LEDs and ensure desirable disinfection conditions are maintained.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the invention there is provided a method of monitoring the functionality of individual irradiation emitters within a UVC irradiation disinfecting device comprising:
supplying a constant current supply to at least one irradiation emitter;
sensing the voltage across the at least one irradiation emitter;
sensing the current drawn by the at least one irradiation emitter;
analysing the sensed voltage and the sensed current against predetermined values; and
determining a failure state of the at least one irradiation emitter based on said analysis.

In one embodiment, the step of analysing the sensed voltage comprises comparing the sensed voltage value against a predetermined ultra-high voltage value, a predetermined ultra-low voltage value, a predetermined high voltage and a pre-determined low voltage.

In one form, the step of analysing the sensed current may comprise comparing the sensed current value against an predetermined ultra-low current value, a predetermined low current value and a predetermined high current value.

In another form, the step of determining the failure state of the at least one irradiation emitter comprises determining whether, when the sensed voltage is greater than the predetermined ultra-high voltage value the sensed current is less than the predetermined ultra-low current value and if so, determining that the irradiation emitter is in a failure state representative of a circuit failure.

In yet another form, the step of determining the failure state of the at least one irradiation emitter comprises identifying that the sensed voltage is less than the predetermined ultra-low voltage and determining that the irradiation emitter is in a failure state representative of a short circuit.

In another form, the step of determining the failure state of the at least one irradiation emitter comprises determining whether, when the sensed voltage is greater than the predetermined ultra-low voltage value but less than the predetermined low voltage value, and the sensed current is less than the predetermined high current value but greater than the predetermined low current value and if so, determining that the irradiation emitter is in a failure state representative of excessive high temperature.

The step of determining the failure state of the at least one irradiation emitter may comprise determining whether, when the sensed voltage is greater than the predetermined low voltage value but less than the predetermined high voltage value, and the sensed current is less than the predetermined high current value but greater than the predetermined low current value and if so, determining that the irradiation emitter is in a normal operating state.

When the irradiation emitter is determined to be in a failure state representative of excessive high temperature, the UVC irradiation disinfecting device may be shut down to allow the irradiation emitter to cool down.

Accordingly, in another aspect of the invention there is provided a device for monitoring the functionality of individual irradiation emitters in a UVC irradiation disinfection device, comprising:
an electricity supply for supplying electricity to activate one or more of the irradiation emitters;
a voltage sensing unit for sensing a voltage value across at least one irradiation emitter;
a current sensing unit for sensing a current value drawn by the at least one irradiation emitter; and
an analysis module configured to receive the sensed voltage value and the sensed current value and to analyse said sensed voltage value and the sensed current value to determine an operational state of the at least one irradiation emitter based on said analysis.

The voltage sensing unit may be connected in parallel with the at least one irradiation emitter being sensed.

The current sensing unit may be connected in series with the at least one irradiation emitter being sensed.

The voltage sensing unit and the current sensing unit may be contained together as a single unit.

The analysis module may comprises a comparator that compares the sensed voltage value against a pre-determined ultra-high voltage value, a predetermined ultra-low voltage value, a predetermined high voltage value and a predetermined low voltage value.

The comparator may further compare the sensed current value against a pre-determined ultra-low voltage value, a predetermined high voltage value and a predetermined low voltage value.

The analysis module may determine a failure state representative of a circuit failure if the sensed voltage is determined by the comparator to be greater than the predetermined ultra-high voltage value and the sensed current value is determined by the comparator to be less than the predetermined ultra-low voltage value.

The analysis module may determine a failure state representative of a short circuit if the sensed voltage value is determined by the comparator to be less than the predetermined ultra-low voltage value.

The analysis module may determine a failure state representative of excessive high temperature if the sensed voltage is determined by the comparator to be greater than the predetermined ultra-low voltage value but less than the predetermined low voltage value and the sensed current value is determined by the comparator to be less than the predetermined high current value but greater than the predetermined low current value.

The analysis module may determine a normal operating state if the sensed voltage is determined by the comparator to be greater than the predetermined low voltage value but less than the predetermined high voltage value and the sensed current value is determined by the comparator to be less than the predetermined high current value but greater than the predetermined low current value.

A display may be provided for displaying the determined failure state or the determined normal operating state to a user of the device. The display may further provide information to the user to address the failure state.

In an embodiment, at least one thermal sensor may be mounted adjacent the one or more irradiation emitters to measure a temperature associated with the one or more irradiation emitters.

Upon the analysis module determining a failure state representative of excessive high temperature, the temperature may be confirmed by comparison with the sensed temperature of the irradiation emitters obtained from the thermal sensor.

According to yet another aspect, there is provided a high-level disinfection device for disinfecting a medical instrument, comprising: a disinfecting enclosure for receiving the medical instrument to be disinfected; a disinfecting irradiation means mounted about the disinfecting enclosure for delivering disinfecting irradiation to a surface of the medical instrument within the disinfecting enclosure; and a detection and control module according to the above aspect, mounted with respect to the disinfecting enclosure for monitoring the functionality of individual irradiation emitters of the disinfecting irradiation means.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The present invention will be described below in relation to its application for use in disinfecting a transducer for a medical ultrasound device. However, it will be appreciated that the present invention could be used in a variety of different applications, both medical and non-medical, where a high-level degree of disinfection of an element is required.

The present invention will also be described in relation to a disinfecting device that utilises UVC LEDs mounted upon an inner wall of an enclosure to emit UVC light to irradiate all surfaces of a medical instrument located within the enclosure. Such a device is disclosed in the Applicants co-pending Australian Provisional Patent Application No. 2019901886, which is incorporated herein by reference.

Figure 7:
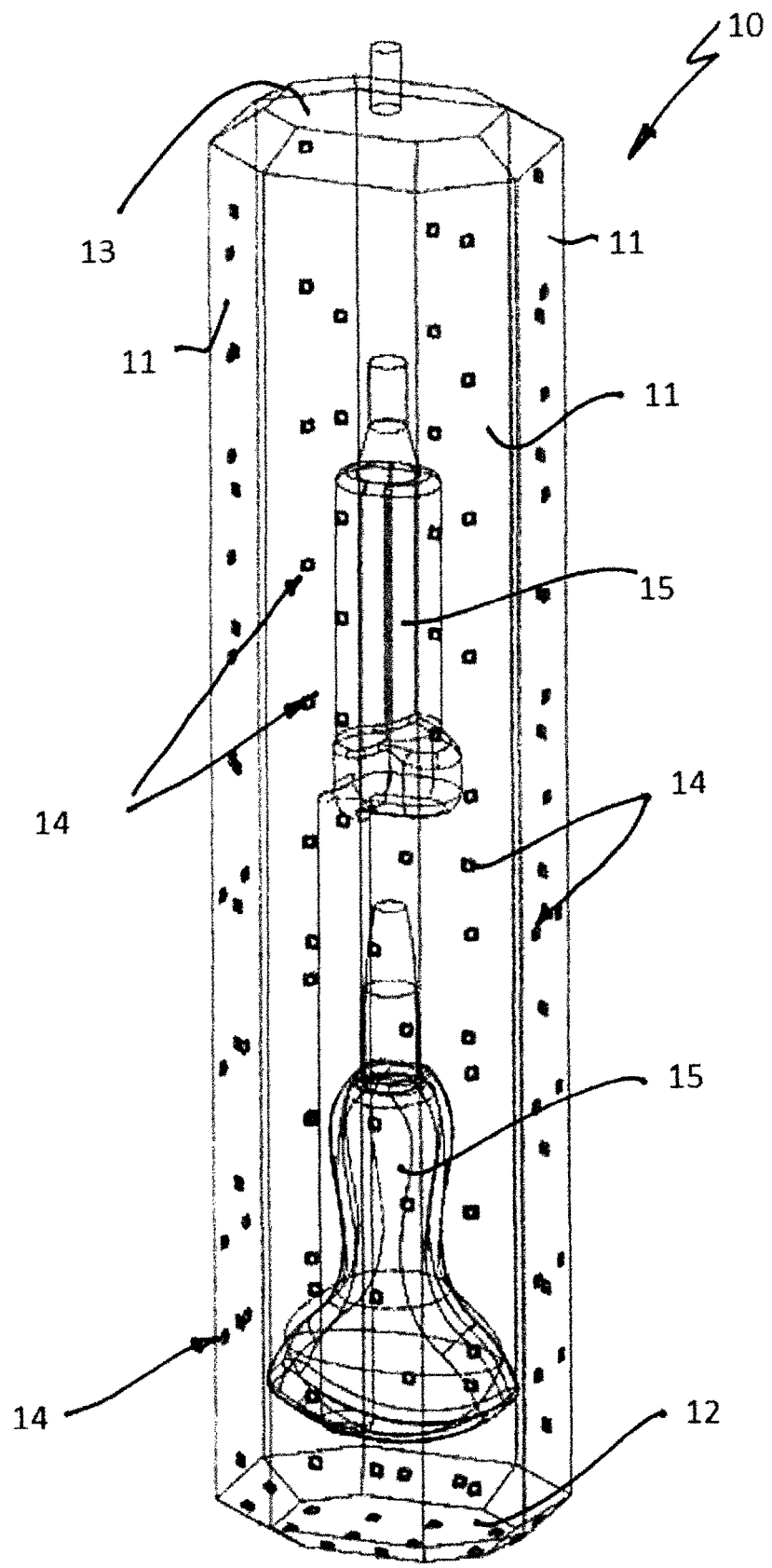
FIG. 7 is a structural diagram of a variation of the high-level disinfection enclosure suitable for use with the system and method of the present invention.

Referring firstly to FIG. 7, a disinfecting enclosure 10 of a disinfecting device suitable for use with the system and method of the present invention is shown. The disinfecting enclosure 10 comprises a plurality of side wall modules 11 arranged in an abutting manner to form an enclosure having an octagonal polyhedron shape. A base module 12 extends across the base of the enclosure 10 and a lid module 13 covers the top of the enclosure 10 such that the enclosure 10 is fully enclosed. Each of the internal surfaces of the side wall modules and base modules have a plurality of UVC LEDs 14 mounted thereon. The UVC LEDs 14 are each controllable to emit UV light to irradiate the surface of the ultrasound transducers 15 mounted within the enclosure 10 for disinfecting.

The sidewall modules 11 generally comprise a cover member that is configured to engage with a frame to mount and support the sidewall modules 11 in an upright manner A light mounting board is provided on a surface of the sidewall modules 11 to enable the UVC LEDs 14 to be mounted on a surface thereof such that they are directed towards the internal space of the enclosure 10. The UVC LEDS 14 are controllable to receive power such that they can emit UV light. In this regard, the rear surface of the light mounting board may be configured to provide wired connection to each of the UVC LEDs such that the LEDs are each individually addressable. A rear surface of the sidewall modules 11 is provide with a heatsink (not shown) that faces away from the internal space of the enclosure 10 and is in contact with the light mounting board and the UVC LEDs to dissipate any heat generated by the UVC LEDs away from the enclosure space. The base module 12, whilst of a different shape, is configured in the same manner as the side wall modules 11.

In the arrangement as shown in FIG. 7, the disinfecting enclosure 10 has the UVC LEDs distributed about the inner surfaces of the disinfecting enclosure 10 with the chips for each of the UVC LEDs 14 being directly mounted to the light board of the modules 11, 12. This arrangement enables the irradiation intensity of the disinfecting enclosure to be controlled in the manner desired, as each of the LEDs is positioned to irradiate each and every surface of the ultrasound transducers 15 mounted therein.

Based on the above described construction of the disinfecting chamber 10, it will be appreciated that should one or more of the UVC LEDs 14 become inactive or otherwise fail to operate to irradiate the surface of the ultrasound transducer, the level of disinfection will become compromised. The possible reasons of the inactivation of LEDs 14 may include: disconnection of the circuit due to LED aging or circuit board failure; a short circuit due to improper voltage conditions or circuit board failure; and a reduction of the radiation efficiency of the LEDs due to natural aging, high temperature conditions and/or unstable current or voltage.

Thus, in accordance with the present invention there is proposed a monitoring apparatus to determine the operational status of the UVC LEDs. Such a monitoring apparatus is intended to use an electrical current & voltage monitoring method to detect any LED inactivation issues and to identify the location of any detected LED inactivation as well as classify the type of the LED inactivation and how the issue may be resolved.

Figure 1:
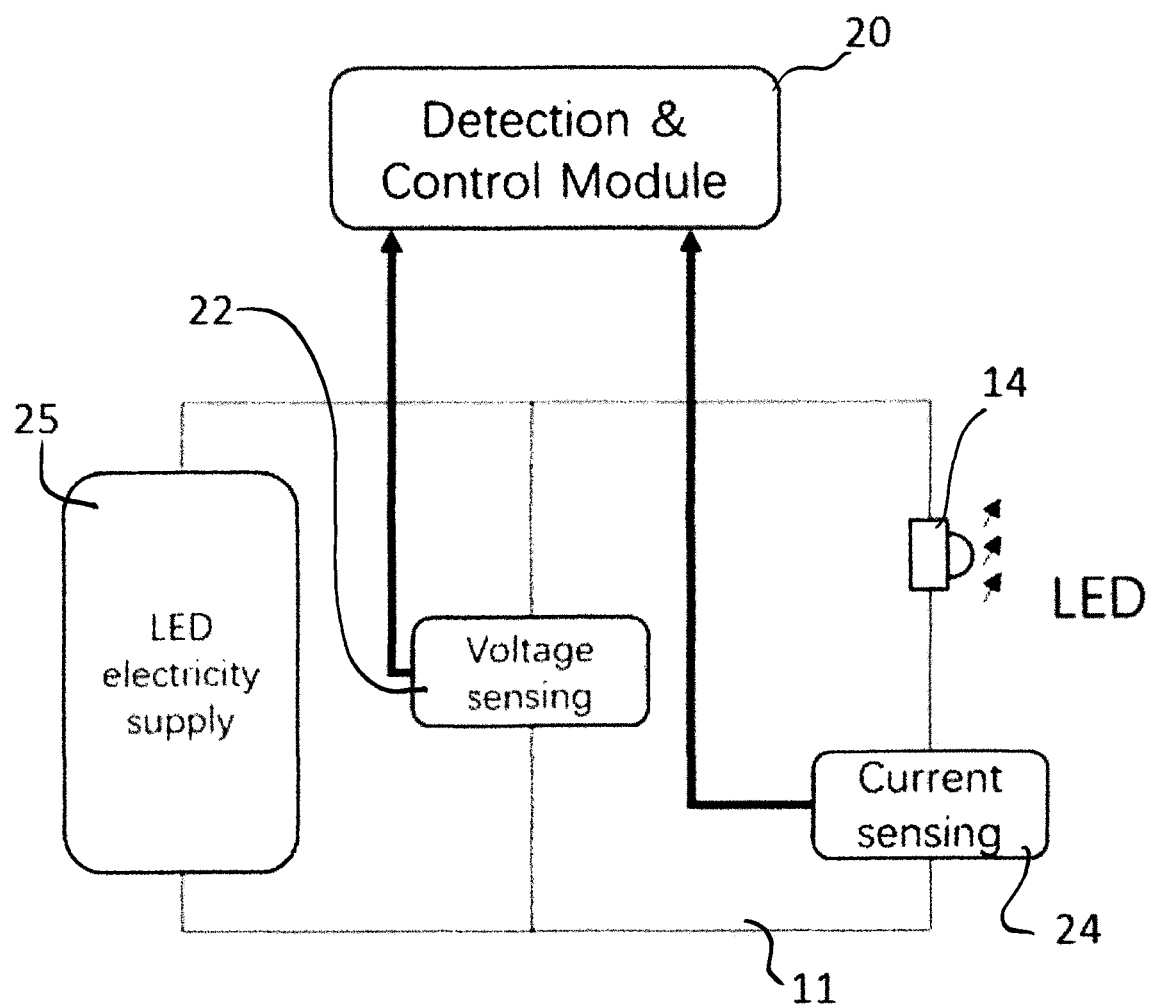
FIG. 1 is a simplified drawing of a detection and control apparatus in accordance with an embodiment of the present invention.

Referring to FIG. 1, there is depicted a voltage and current sensing apparatus 20 for an LED supply circuit in accordance with an embodiment of the present invention. The apparatus 20 senses the voltage across the LED 14 through a voltage sensor 22 that is connected in parallel with the LED 14 and the LED electricity supply 25. The apparatus 20 is also in connection with a current sensor 24 that is connected in series with the LED 14 to sense the current being drawn by the LED 14 in the loop of the LED electricity supply 25.

There exist a variety of ICs (integrated circuits) that are capable of simultaneously sensing the voltage and current of a circuit, and are connected in the manner as depicted in FIG. 1. In this regard, the voltage sensor 22 is connected in parallel with the LED electricity supply 25, and the current sensor 24 is connected in series with the LED electricity supply 25. In such an arrangement, when the electricity supply 25 operates and the circuit of the ultra-violet LED 14 is connected, the voltage and current drawn by the LED 14 can be sensed simultaneously and fed to the detection and control module 20.

In the present embodiment, the electricity supply 25 for the LED 14 is a "constant current supply", which means that during operation, a constant current is generated, no matter how the load side varies. Typically, when the LED operates, it generates heat which results in a rise in temperature. This situation causes a decrease in the internal resistance of the LED 14 and an increase in the current being drawn by the LED 14. If the current being supplied to the LED 14 from the electricity supply 25, is not regulated, the increase of the current being drawn by the LED 14 will speed up the amount of heat being generated by the LED 14 and thus the decaying of the LED 14. For this reason, the system and method of the present invention employs a "constant current supply" for the LEDs 14.

Figure 2:
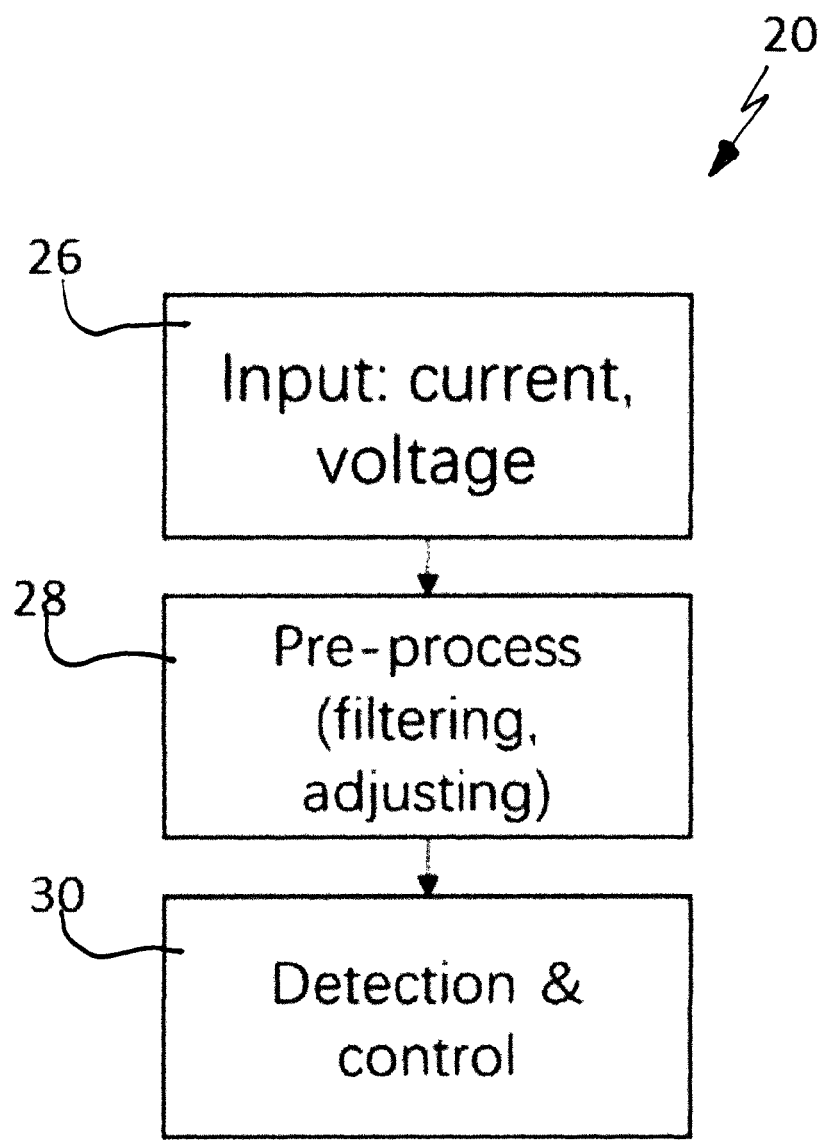
FIG. 2 is a flowchart depicting the steps undertaken by a detection and control module of the apparatus of FIG. 1.

The detection and control module 20 of the present invention is able to further process and analyse the sensed voltage and current in the following manner, as depicted in the flow chart of FIG. 2

In a preferred embodiment, the detection and control module 20 performs three main steps 26, 27 and 28.

In Step 26 the current and voltage sensing data is received from the voltage sensor 22 and current sensor 24. In step 28, the received data is pre-processed by filtering and adjusting the measurements to remove any error readings or residual voltage and current readings that may adversely effect the process. Step 30 includes conducting analysis and control of the readings to identify fault states and the appropriate action required to address the faults.

The analysis and control step 30 is conducted according to the following rules.

Preset the ultra-high voltage (UHV), high voltage (HV), low voltage (LV), ultra-low voltage (ULV); preset the ultra-low current (ULC), low current (LC), high current (HC).

When the input voltage to the LED 14 (VI)≥UHV, and at the same time, the input current to the LED 14 (CI) <ULC, a failure state is determined with the circuit being disconnected.

When the input voltage to the LED 14 VI<ULV, a failure state is determined as a failure with short circuit.

When ULV≤VI<LV, and LC≤CI<HC, a failure state is determined with excessive high temperature. In this case, the LED 14 is recoverable, but it must be cooled down to recover its normal radiation state.

At the same time, a thermal sensor can be used to verify or confirm the high temperature. Of the LED 14

When LV≤VI<HV, and LC≤CI<HC, a normal operating conditioned is determined and the system can continue as normal.

Figure 6:
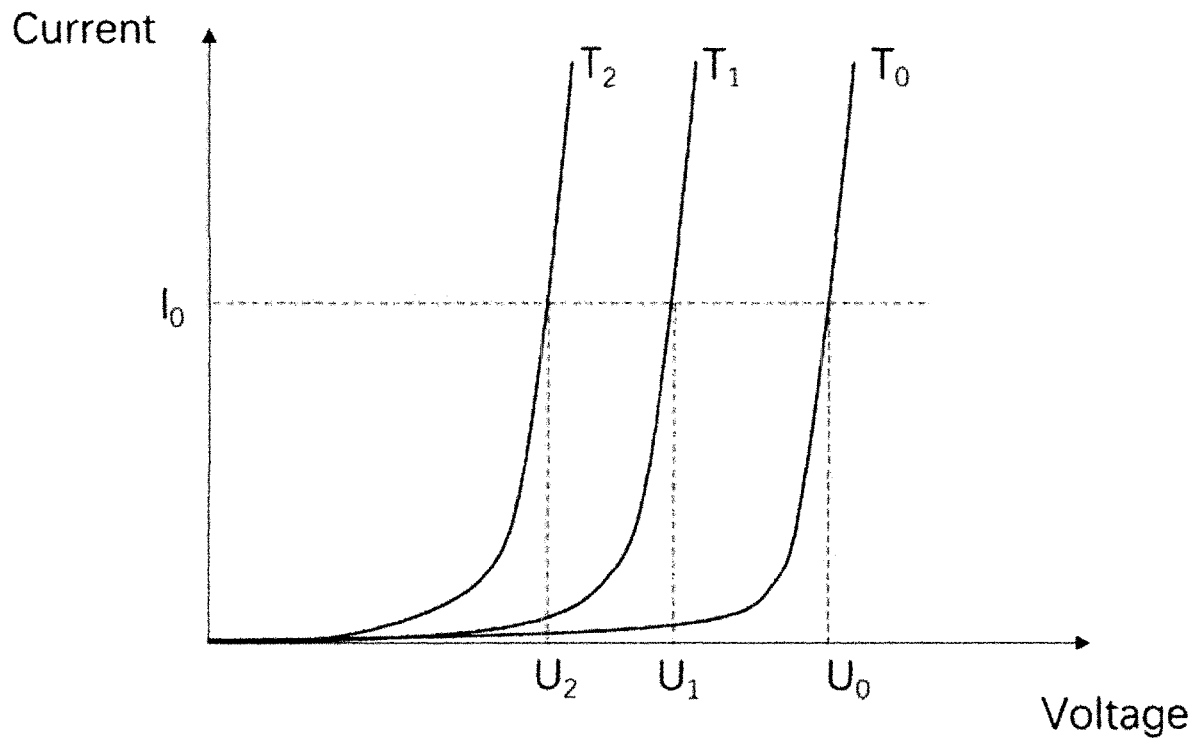
FIG. 6 is a current-voltage graph depicting the relationships between voltage, temperature and current of the LEDs in accordance with the present invention.

The detection and control step 30 is able to infer the temperature of the LED 14 from the measured input voltage due to the physical property of the UVC LEDs used in the system. Thus, for a constant given electrical current used to drive the LED 14, the voltage of the LED 14 will decrease as the temperature of the LED 14 rises. This is shown in the graph depicted in FIG. 6, where the depicted current-voltage curve reflects the relationship between the voltage and the current of the LED 14, with the curves shifting to the left being due to a rise in the temperature of the LED 14. In this graph, $T_0<T_1<T_2$ and given that the working current is constant $I_0$ the voltage of the LED is $U_0<U_1<U_2$.

The detection and control step 30 of the present invention is also able to identify/recommend the necessary treatment required to address the detected failure state according to the assessed result. In this regard:

For a determined failure state due to disconnection and short circuit, it is required to replace/repair the LED 14 or the circuit; and For the excessive high temperature failure state, the disinfecting device should be shut down until the temperature of the LED 14 drops to a safe level, and then the machine can work again.

It will be appreciated that as the electric properties of UVC LEDs may vary, the preset value of voltage and current for different UVC LEDs can be calibrated to fit each UVC LED.

In accordance with the present invention, the disinfecting device will have arrays of UVC LEDs arranged to radiate UVC light to cover the disinfection surface of a medical instrument contained within the disinfecting enclosure. Typically, and as is depicted in the systems 40, 41 and 42 of FIGS. 3-5, a driving circuit 45 (that is, the constant current supply) can supply the electricity for one LED 14 or a group of LEDs 14, as shown. Each driving circuit can be equipped with one voltage and current sensing unit 48. In each of the cases 40, 41 and 42, a detection and control module is able to identify the position of the LED 14 failure through access of the sensing data from the sensing unit 48.

Therefore, the system and method of the present invention is directed towards monitoring the operation of the disinfecting device to determine any problems with the UVC LEDs, and in the event of a problem arising, identifying the type of the problem by monitoring the electrical signals of the LED.

This is achieved by adding a voltage and current sensing unit on each driving unit of the UVC LEDs and using sensed voltage and current values to assess the working states of the associated UVC LEDs. The working states include: a failure state (due to disconnection, short circuit, excessive high temperature), and normal or working state.

Due to the nature of the present invention, the actual location of the faulty LED(s) within the plurality of arrays of LEDs mounted about the disinfecting chamber can be simply identified the sensing unit position.

Such a system and method is able to provide a proper and prompt warning of a failure and the type of failure of the UVC LED(s) as well as a position or location of the failed LED(s). This can be achieved within the existing structure of the device as the added components of a voltage and current sensing device can be simply added to the system circuitry and not to the overall structure of the device.

Figure 3:
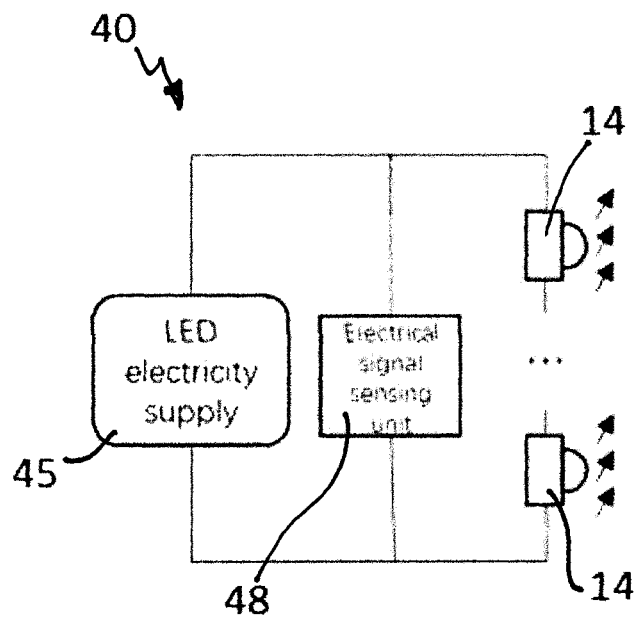
FIG. 3 depicts an alternative embodiment of a circuit for use with the detection and control apparatus of FIG. 1.
Figure 4:
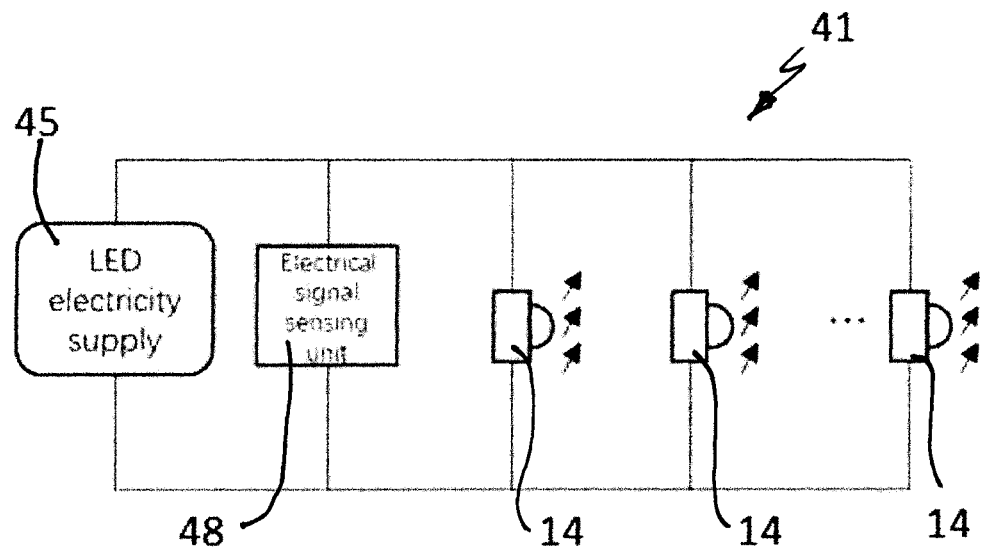
FIG. 4 depicts another alternative embodiment of a circuit for use with the detection and control apparatus of FIG. 1.
Figure 5:
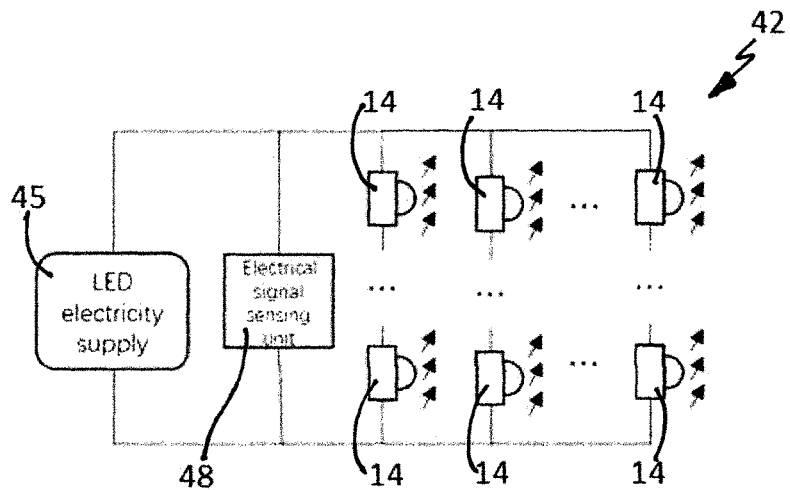
FIG. 5 depicts yet another alternative embodiment of a circuit for use with the detection and control apparatus of FIG. 1.

The present system and method can be varied in the manner as depicted in FIGS. 3-5. In this regard, the constant current driver 45 to the UVC LED can drive one LED (FIG. 1), or a group of LEDs with serial connection (FIG. 3), parallel connection (FIG. 4), and serial-parallel connection (FIG. 5). Accordingly, the sensing unit 48 added on the driver can be used for one LED, or a group of LEDs with serial connection, parallel connection, and serial-parallel connection.

It will also be appreciated that during a single disinfection process for the disinfecting device, the temperature of each LED may usually rise from an initial low temperature to a high temperature. Similarly, with a constant current driver, the voltage of the LEDs will decline over time. Therefore, through dynamic monitoring of the voltage change, the temperature of the LED can be determined together with the overall temperature of the disinfection enclosure through the voltage of the LED.

The present system can calibrate preset values before the disinfection device is even manufactured. Alternatively, calibration of the preset values can also be done on site. In this regard, if the disinfecting device has cooled down for a long time, the temperature of the LEDs can be assumed to be the same as the room temperature. For ease of use, a calibration program can be run to make the LEDs work for a short time so the temperature will not rise and the voltage and current of that temperature can be used for calibration.

It should be understood that in the description of the present invention provided above, the term "storage medium" may be a medium that can store a computer program, such as a ROM, a RAM, a magnetic disk, or an optical disk, unless otherwise explicitly defined and defined. The term "processor unit" may be CPLD (Complex Programmable Logic Device), FPGA (Field-Programmable Gate Array), MCU (Microcontroller Unit), PLC (Programmable Logic Controller). A chip or circuit with data processing functions such as a CPU (Central Processing Unit). The term "electronic device" may be any device having data processing functions and storage functions, and may generally include a fixed terminal and a mobile terminal. Fixed terminals such as desktops. Mobile terminals such as mobile phones, tablets, and mobile robots. Further, the technical features involved in the different embodiments of the present invention described later may be combined with each other as long as they do not constitute a conflict with each other.

The above are only the preferred embodiments of the present invention and are not intended to limit the present invention. Any modifications, equivalent substitutions, and improvements made within the spirit and principles of the present invention should be included in the range of protection of the present invention.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the enclosure uppermost.

It will be appreciated by those skilled in the art that many modifications and variations may be made to the methods of the invention described herein without departing from the spirit and scope of the invention.

The invention claimed is:

1. A method of monitoring the functionality of individual irradiation emitters within a UVC irradiation disinfecting device comprising:
supplying a constant current supply to at least one irradiation emitter;
sensing the voltage across the at least one irradiation emitter to obtain a sensed voltage value for the at least one irradiation emitter;
sensing the current drawn by the at least one irradiation emitter to obtain a sensed current value for the at least one irradiation emitter;
analyzing the sensed voltage by comparing the sensed voltage value against a predetermined ultra-high voltage value, a predetermined ultra-low voltage value, a predetermined high voltage and a pre-determined low voltage and analyzing the sensed current by comparing the sensed current value against a predetermined ultra-low current value, a predetermined low current value and a predetermined high current value; and
determining a failure state of the at least one irradiation emitter, including a failure state representative of the at least one irradiation emitter operating at an excessive high temperature based on said analysis of the sensed voltage and the sensed current.

2. A method according to claim 1, wherein the step of determining the failure state of the at least one irradiation emitter comprises determining whether, when the sensed voltage is greater than the predetermined ultra-high voltage value the sensed current is less than the predetermined ultra-low current value and if so, determining that the irradiation emitter is in a failure state representative of a circuit failure.

3. A method according to claim 1, wherein the step of determining the failure state of the at least one irradiation emitter comprises identifying that the sensed voltage is less than the predetermined ultra-low voltage and determining that the irradiation emitter is in a failure state representative of a short circuit.

4. A method according to claim 1, wherein the step of determining the failure state representative of the at least one irradiation emitter operating at an excessively high temperature comprises determining that the sensed voltage is greater than the predetermined ultra-low voltage value but less than the predetermined low voltage value, and the sensed current is less than the predetermined high current value but greater than the predetermined low current value.

5. A method according to claim 1, wherein the step of determining the failure state of the at least one irradiation emitter comprises determining the sensed voltage is greater than the predetermined low voltage value but less than the predetermined high voltage value, and the sensed current is less than the predetermined high current value but greater than the predetermined low current value and if so, determining that the irradiation emitter is in a normal operating state.

6. A method according to claim 4, wherein when the irradiation emitter is determined to be in a failure state representative of excessive high temperature, the UVC irradiation disinfecting device is shut down to allow the irradiation emitter to cool down.

7. A device for monitoring the functionality of individual irradiation emitters in a UVC irradiation disinfection device, comprising:
   an electricity supply for supplying electricity to activate one or more of the irradiation emitters;
   a voltage sensing unit for sensing a voltage value across at least one irradiation emitter;
   a current sensing unit for sensing a current value drawn by the at least one irradiation emitter; and
   an analysis module configured to receive the sensed voltage value and the sensed current value and to analyze said sensed voltage value by comparing the sensed voltage value against a predetermined ultra-high voltage value, a predetermined ultra-low voltage value, a predetermined high voltage and a pre-determined low voltage and analyzing the sensed current by comparing the sensed current value against a predetermined ultra-low current value, a predetermined low current value and a predetermined high current value and analyzing the sensed current by comparing the sensed current value against a predetermined ultra-low current value, a predetermined low current value and a predetermined high current value to determine an operational state of the at least one irradiation emitter including a failure state representative of the at least one irradiation emitter operating at an excessive high temperature based on said analysis of the sensed voltage and the sensed current.

8. A device according to claim 7, wherein the voltage sensing unit is connected in parallel with the at least one irradiation emitter being sensed.

9. A device according to claim 7, wherein the current sensing unit is connected in series with the at least one irradiation emitter being sensed.

10. A device according to claim 7 wherein the voltage sensing unit and the current sensing unit are contained together in a single package.

11. A device according to claim 10, wherein the analysis module comprises a comparator for comparing the sensed voltage value against the pre-determined ultra-high voltage value, the predetermined ultra-low voltage value, the pre-determined high voltage value and the predetermined low voltage value.

12. A device according to claim 11 wherein the comparator further compares the sensed current value against the pre-determined ultra-low voltage value, the predetermined high voltage value and the predetermined low voltage value.

13. A device according to claim 12, wherein the analysis module determines a failure state representative of a circuit failure if the sensed voltage is determined by the comparator to be greater than the predetermined ultra-high voltage value and the sensed current value is determined by the comparator to be less than the predetermined ultra-low voltage value.

14. A device according to claim 12, wherein the analysis module determines a failure state representative of a short circuit if the sensed voltage value is determined by the comparator to be less than the predetermined ultra-low voltage value.

15. A device according to claim 12, wherein the analysis module determines the failure state representative of the at least one irradiation emitter operating at an excessive high temperature if the sensed voltage is determined by the comparator to be greater than the predetermined ultra-low voltage value but less than the predetermined low voltage value and the sensed current value is determined by the comparator to be less than the predetermined high current value but greater than the predetermined low current value.

16. A device according to claim 12, wherein the analysis module determines a normal operating state if the sensed voltage is determined by the comparator to be greater than the predetermined low voltage value but less than the predetermined high voltage value and the sensed current value is determined by the comparator to be less than the predetermined high current value but greater than the predetermined low current value.

17. A device according to any one of claim 16, further comprising a display for displaying the determined failure state or the determined normal operating state to a user of the device.

18. A device according to claim 17, wherein the display further provides information to the user to address the failure state.

19. A device according to claim 7, further comprising at least one thermal sensors mounted adjacent the one or more irradiation emitters to measure a temperature associated with the one or more irradiation emitters.

20. A device according to claim 19, wherein upon the analysis module determining a failure state representative of the at least one irradiation emitter operating at an excessive high temperature, the temperature can be confirmed by comparison with the sensed temperature of the irradiation emitters obtained from the thermal sensor.

21. A high-level disinfection device for disinfecting a medical instrument, comprising:
   a disinfecting enclosure for receiving the medical instrument to be disinfected;
   a disinfecting irradiation means mounted about the disinfecting enclosure for delivering disinfecting irradiation to a surface of the medical instrument within the disinfecting enclosure; and a
   a detection and control module according to claim 7, mounted with respect to the disinfecting enclosure for monitoring the functionality of individual irradiation emitters of the disinfecting irradiation means.

* * * * *